Patented Feb. 18, 1947

2,415,969

UNITED STATES PATENT OFFICE 2,415,969

PROCESS FOR ESTERIFYING A CATALYTICALLY DEHYDRATED AND HEAT-BODIED CASTOR OIL

Alfred E. Rheineck and Samuel B. Crecelius, Louisville, Ky., assignors to Devoe & Raynolds Company, Inc., a corporation of New York No Drawing. Application January 14, 1944, Serial No. 518,476

4 Claims. (Cl. 260—104)

This application is based upon our discovery that there is a group of substances which have the combined capacity of acting as exceedingly efficient dehydration catalysts for castor oil and also include the ability to act as bodying catalysts so that when castor oil is treated with one of these materials the oil is bodied almost as rapidly as it is dehydrated. Since a large amount of water is evolved during the bodying operation as an incident to the dehydration, there is some tendency to split off fatty acids from the oil. Instead of trying to distill off these free fatty acids, they can be esterified with polyhydric alcohol. However, we find that an efficient way of making a varnish is to treat the castor oil with our particular catalyst and then to react the resulting body with an excess of polyhydric alcohol having at least three carbon atoms and finally to react the remaining free hydroxyl groups of such alcohol with a resin such as rosin, tall oil or other usual resin acids. This results in the production of a molecular varnish composition.

The substances which we prefer to use as catalysts are the heteropoly tungstic acids which include such acids as silico-tungstic acid ($H_4SiW_{12}O_{40}.XH_2O$), phospho-tungstic acid ($H_7P(W_2O_7)_6.XH_2O$) boro-tungstic acid ($H_9B(W_2O_7)_6.22H_2O$) and molybdo-phospho-tungstic acid ($MoO_3.P_2O_5.17WO_3.24H_2O$).

The action of these substances appears to be purely catalytic and in fact only very minute traces should be used. Thus if one uses as much as one percent of these substances based on the weight of the oil, the product tends to react with violence and frequently in a few minutes at a temperature of from 160° C. to 170° C. will yield products which are black gels. In our experience it is very rare that more than 0.2% should be employed. Actually, we find it preferable to use between 0.005 and 0.1% and generally speaking the best results seem to be had using between 0.01 and 0.05%. It will be noted that the amount of this catalyst used runs from about $\frac{1}{10}$ to $\frac{1}{500}$ of the amount of catalyst normally employed for dehydration purposes.

In treating castor oil with this catalyst to effect simultaneous dehydration and heat-bodying, it is preferable that the temperature should be raised to a temperature of 220° C. and preferably to 260° C. in each case. Working with castor oil, water will be driven off so rapidly at these temperatures that foaming will be substantial and the extent of foaming will impose a practical top limit on the temperature at various stages in the dehydration. Ordinarily one would not want to go above 310° C. for more than a few moments and it will usually be found best not to exceed 350° C.

The amount of catalyst employed is so small that it ordinarily will not be necessary to remove it from the oil but if desired all or a part of the catalyst can be precipitated out by the formation of insoluble salts, as for example by the use of a small amount of lime or other reactive calcium compound, or by using corresponding compounds of lead or of other metals that will form insoluble compounds by reaction with the particular catalyst.

In the ordinary treatment of castor oil, the dehydration step takes about three hours and if the product is to be made into a varnish, an additional period of from four to five hours is consumed in heat-bodying. Using our process we have obtained a substantially dehydrated castor oil bodied to a viscosity of $Z_2$ or $Z_3$ on the Gardner-Holdt scale in about three hours. This means a great economy of operation and also produces an oil of desirable color.

As we have pointed out above, there ordinarily is a substantial formation of free fatty acids during this treatment, and we have found that it can be used as an efficient basis for making varnish by adding an excess of a polyhydric alcohol which is subsequently esterified by other bodies such as rosin.

In carrying out the operation, a solvent may be employed to aid in distilling off the water. If a low boiling solvent such as xylene is used, the amount employed should be small enough so that the solution as a whole will have a boiling point high enough to give the desired result.

Ordinarily our catalyst will be mixed with the oil and the oil treated in batch lots. However, it also may be applied to a carrier such as asbestos fibers and then packed in a vertical heated tower. This operation however is not as useful in the manufacture of varnishes as it is in the preparation of simple dehydrated oils, as is explained more fully in our copending application Ser. No. 387,180, filed April 7, 1941 (now Patent No. 2,345,358), of which the present application is a continuation in part.

The following is an example illustrating our process:

*Example*

Castor oil was heated with 0.03% of silico-tungstic acid until a viscosity of $Z_3$ was reached. At this stage the product contained an appreciable precentage of free fatty acids. 1780 parts of this product was cooled to about 200° C. and 92 parts of glycerol and one part of calcium acetate were added with stirring. This amount of glycerol was in excess of the amount necessary to react with the free fatty acids to produce the triglyceride. The calcium acetate was added to serve as a catalyst to cause a reaction to take place between the glycerol and the bodied dehydrated castor oil by alcoholysis in addition to the straight esterification reaction between the free fatty acids and the glycerol, and also causes a neutralization and precipitation of the initial catalyst. A temperature of 260° C. was gained and held for 30 minutes. Then 1150 parts of WG rosin and 100 parts of 100% phenolic resin (reactive type) was stirred in and the temperature was raised to 270° C. and held for 3 hours, causing an esterification of residual hydroxyl groups to take place.

The varnish was cooled to 270° C. and thinned with mineral spirits to a viscosity of F on the Gardner-Holdt scale, at which point it contained about 50% solids. Usual driers were added and the resulting varnish dried in 8 hours.

In this example only one of the catalysts is mentioned but the use of other of the catalysts is described in our said copending application. Also it is obvious that other polyhydric alcohols may be employed, such for example as pentaerythritol, sorbitol or mannitol.

From this example and the foregoing description the methods of utilizing our invention in other specific manners can readily be understood.

What we claim is:

1. A method of making varnish which comprises heating castor oil progressively to reach a temperature of between 220° C. and 350° C. with between 0.005% and 0.2% of a heteropoly acidic compound of tungsten until the castor oil is largely dehydrated and substantially heat-bodied, adding an additional amount of a polyhydric alcohol containing at least three carbon atoms in excess of that necessary to neutralize resulting free fatty acids, heating to cause such polyhydric alcohol to react and esterifying residual hydroxyl groups with a natural resin acid.

2. A process as specified in claim 1 in which the natural resin acid employed is rosin.

3. A process as specified in claim 1 in which the polyhydric alcohol is glycerine.

4. A process as specified in claim 1 in which the polyhydric alcohol is glycerine and a small amount of calcium acetate is added with the glycerine to assist in causing alcoholysis to take place.

ALFRED E. RHEINECK.
SAMUEL B. CRECELIUS.

REFERENCES CITED

The following references are of record in the file of this patent:

UNITED STATES PATENTS

| Number | Name | Date |
|---|---|---|
| 1,937,533 | Rosenblum | Dec. 5, 1933 |
| 2,226,831 | Priester | Dec. 31, 1940 |